(12) United States Patent
Mullooly et al.

(10) Patent No.: US 8,503,329 B2
(45) Date of Patent: Aug. 6, 2013

(54) SIGNALING OF ATTACHMENT CIRCUIT STATUS AND AUTOMATIC DISCOVERY OF INTER-CHASSIS COMMUNICATION PEERS

(75) Inventors: John J. Mullooly, Colts Neck, NJ (US); Ali Sajassi, San Ramon, CA (US); Pradosh K. Mohapatra, Fremont, CA (US); Samer M. Salam, Vancouver (CA)

(73) Assignee: Cisco Technology, Inc., San Jose, CA (US)

( * ) Notice: Subject to any disclaimer, the term of this patent is extended or adjusted under 35 U.S.C. 154(b) by 606 days.

(21) Appl. No.: 12/536,427

(22) Filed: Aug. 5, 2009

(65) Prior Publication Data
US 2011/0032945 A1 Feb. 10, 2011

(51) Int. Cl.
*H04L 12/28* (2006.01)

(52) U.S. Cl.
USPC .......................................................... 370/254

(58) Field of Classification Search
USPC ................................................. 370/254, 401
See application file for complete search history.

(56) References Cited

U.S. PATENT DOCUMENTS

| | | | |
|---|---|---|---|
| 7,899,930 B1 * | 3/2011 | Turner et al. | 709/238 |
| 8,005,090 B2 * | 8/2011 | Nakamichi et al. | 370/395.21 |
| 2010/0020680 A1 * | 1/2010 | Salam et al. | 370/225 |
| 2010/0166001 A1 * | 7/2010 | Uttaro et al. | 370/401 |
| 2010/0278076 A1 * | 11/2010 | Reddy et al. | 370/254 |
| 2010/0322258 A1 * | 12/2010 | Dynarski et al. | 370/401 |

* cited by examiner

*Primary Examiner* — Dang Ton
*Assistant Examiner* — Kevin Lee
(74) *Attorney, Agent, or Firm* — Schwegman, Lundberg & Woessner, P.A.

(57) ABSTRACT

In an embodiment, a method of signaling status at a routing device is provided. In this method, the routing device establishes an inter-chassis control plane channel session with a remote routing device. Here, the routing device and the remote routing device are linked to a multi-homed routing device. The routing device then synchronizes with the remote routing device by way of the inter-chassis control plane channel session to identify a state of a link from the routing device to the multi-homed routing device. The state of the link is thereafter advertised by way of Border Gateway Protocol (BGP). Additionally, a method of discovering inter-chassis communication peers via BGP between the first and remote routing devices is provided.

21 Claims, 10 Drawing Sheets

SIGNALING OF ATTACHMENT CIRCUIT STATUS AND AUTOMATIC DISCOVERY OF INTER-CHASSIS COMMUNICATION PEERS

FIELD

The present disclosure relates generally to computer networks.

BACKGROUND

In access link and node redundancy for service provider based Layer 2 Virtual Private Network (L2VPN) services, customers typically desire resilient site multi-homing access capabilities that are similar to Layer 3 VPN services. However, redundancy in the L2VPN topologies are much more complex compared to Layer 3 VPN topologies because of potential Ethernet frame looping conditions.

One solution to avoid looping conditions is to apply a spanning tree protocol. However, the spanning tree protocol has problems with scalability, and can also result in looping conditions if the spanning tree protocol is misconfigured. Additionally, the spanning tree protocol is typically run "over the top" of a service provider's network and thus the service provider has no control or visibility that the solution is enabled and working properly. Another solution to avoid looping conditions, which the service provider can control, is to use Multi-Protocol Border Gateway Protocol (MP-BGP) with virtual endpoint identifiers (VE-ID). Typically, each provider edge router would have just one VE-ID, and as a result, the VE-ID is used to uniquely identify each provider edge router to the rest of the network. However with a multi-homing approach, the same VE-IDs need to be shared across multiple provider edge routers, thus each VE-ID no longer uniquely identifies each provider edge router. Rather, each VE-ID is reassigned to identify uniquely each multi-homed device (e.g., a customer edge router). Therefore, the original intent and benefits of the VE-ID is lost and it becomes an attribute of the multi-homed device rather than the provider edge router, which is not a scalable solution. That is, with the VE-IDs being attributes of multi-homed devices, more information and data are signaled within the context of a service, and such signaling can be inefficient and complicated to implement and can result in scalability issues in signaling.

BRIEF DESCRIPTION OF DRAWINGS

The present disclosure is illustrated by way of example and not limitation in the figures of the accompanying drawings, in which like references indicate similar elements and in which.

DESCRIPTION OF EXAMPLE EMBODIMENTS

In the following description, for purposes of explanation, numerous specific details are set forth in order to provide a thorough understanding of an example embodiment of the present disclosure. It will be evident, however, to one skilled in the art that the present disclosure may be practiced without these specific details.

Overview

A method of signaling status at a first routing device is provided. In this method, the first routing device establishes an inter-chassis control plane channel session with a second routing device. Here, the first routing device and the second routing device are linked to a multi-homed routing device. The first routing device then synchronizes with the second routing device by way of the inter-chassis control plane channel session to identify a state of a link from the first routing device to the multi-homed routing device. The state of the link is thereafter advertised by way of Border Gateway Protocol (BGP).

A method of discovering inter-chassis communication peers at a first routing device is provided. In this method, the first routing device identifies a first system identifier associated with a multi-homed routing device linked to the first routing device. Additionally, the first routing device receives a second system identifier from a second routing device by way of BGP. The first system identifier is compared with the second system identifier, and an inter-chassis control plane channel session is established with the second routing device based on a match of the first system identifier with the second system identifier.

Example Embodiments

Attachment Circuit Status Signaling

Figure 1:
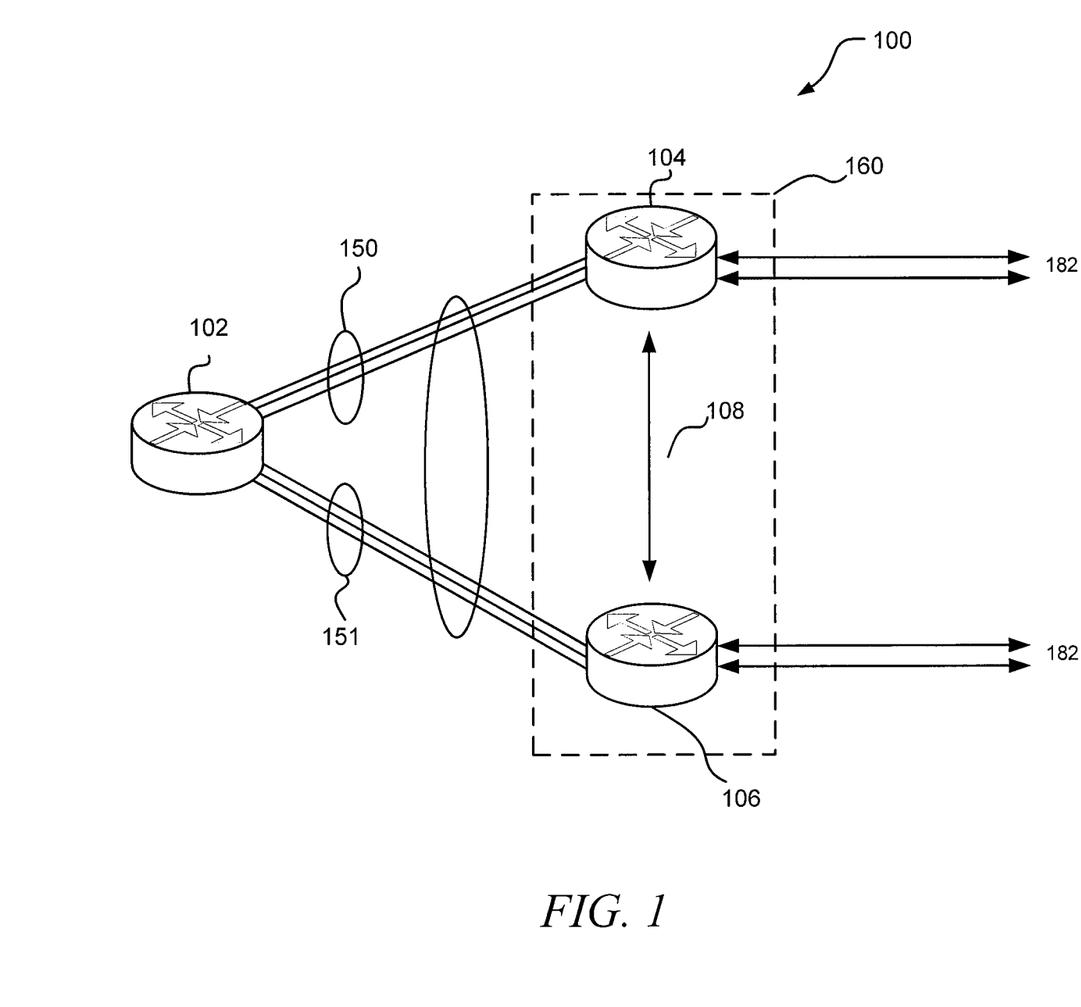
FIG. 1 depicts a diagram of an example of a network system, in accordance with an illustrative embodiment, utilizing multi-chassis link aggregation.

FIG. 1 depicts a diagram of an example of a network system 100, in accordance with an illustrative embodiment, utilizing multi-chassis link aggregation. The network system 100 includes a dual-homed routing device 102, which is a type of a multi-homed routing device, linked with routing devices 104 and 106. It should be appreciated that multi-homing is a network topology in which a network device is connected to the network by way of two or more independent access points (or points of attachment). Therefore, a dual-homed device, such as dual-homed routing device 102, is a network device connected to a network by way of two independent access points. A triple-homed device is a network device connected to a network by way of three independent access points.

The communication links 150 and 151 to the routing devices 104 and 106, respectively, are aggregated or bundled. In general, link aggregation (or multi-chassis link aggregation) refers to combining multiple physical communication links (e.g., communication links 150 or 151) into a single, logical communication link. That is, a set of multiple, parallel communication links between two network devices can be grouped together to form a single logical link. As depicted in FIG. 1, the multiple communication links 150 to the routing device 104 are aggregated into a single, logical communication link. Similarly, the multiple communication links 151 to the routing device 106 are aggregated into another single, logical communication link.

Aggregating the communication links 150 and 151 increases the capacity and availability of the communication channels between network devices (e.g., routing devices 102, 104, and 106) using, for example, Fast Ethernet and Gigabit Ethernet technology. For example, two or more Gigabit Ethernet connections may be aggregated or combined together to increase the bandwidth capability and to create resilient and redundant links. If one communication link in the bundled communication links 150 fails, then the network traffic carried by that communication link can be transferred to other communication links within the same bundled communication links 150, if available, in order to maintain network connectivity.

A "link aggregation protocol" is a protocol to control the aggregation or bundling of several physical communication links together to form a single logical channel. The link aggregation protocol, for example, allows a routing device to negotiate an automatic aggregation of communication links by sending link aggregation packets to its peers that also run the same link aggregation protocol. In another example, link aggregation protocol allows a multi-homed device to receive control information from a network device, which causes the multi-homed device to switch its network traffic from the links on one access node to links on a different access node. An example of a link aggregation protocol is Link Aggregation Control Protocol (LACP), as defined in IEEE standard 802.3ad, which is a protocol that controls the bundling of several physical ports together to form a single logical channel. Another example of a link aggregation protocol is multi-chassis LACP (mLACP), which extends the concept of LACP such that one end of LACP is further split between two or more network devices, such as routing devices 104 and 106. Generally, mLACP protocol is a protocol for multi-homing connections to a network. For example, as depicted in FIG. 1, the bundled communication links 150 and 151 to separate routing devices 104 and 106, respectively, can be further aggregated into a single logical channel. It should be noted that mLACP increases network reliability. The PE devices 104 and 106 are physically separate elements providing redundant access to routing device 102, along with physical separate attachment circuits, which are connected to the communication links 150 and 151, terminating on the routing devices 104 and 106, respectively.

The routing devices 104 and 106 are in communication with each other by way of an inter-chassis control plane channel 108 and are grouped as a single redundancy group 160, which refers to groupings of network devices (e.g., routing devices 104 and 106) for providing access protection to multi-homed devices. As used herein, an "inter-chassis control plane channel," (e.g., inter-chassis control plane channel 180) refers to a control channel for communication between routing devices within a redundancy group (e.g., routing devices 104 and 106). The inter-chassis control plane channel 108 may be based on, for example, Inter-Chassis Communication Protocol (ICCP), Inter-Chassis Backup (ICB), and Virtual Switch Link (VSL).

Link aggregation protocol thus provides the communication channel that enables redundant Ethernet access circuits to be terminated across multiple devices and thus, extending reliability beyond just link level protection but also to device level protection. As illustrated in FIG. 1, link aggregation protocol allows one of the bundled communication links 150 or 151 to serve as a backup link by managing the bundled communication links 150 and 151 in "active" and "standby" states (or modes) such that only one set of the bundled communication links 150 or 151 is active at a time. For example, the communication links 151 are actively passing network traffic while the communication links 150 are in a standby state. If the communication links 151 fail, then the communication links 150 can take over the network traffic, thereby maintaining network connectivity.

It should be appreciated that the state of bundled links 150 or 151 may also be referred to as an "attachment circuit state," and such terms may be used interchangeably. Generally, an "attachment circuit," is a physical or virtual circuit attaching, for example, a multi-homed routing device 102 to a remote routing device 104 or 106. An attachment circuit can be, for example, an Ethernet port or a Virtual Local Area Network (VLAN) on the Ethernet port. It should also be noted that the forwarding status of one or more pseudowires 182 (e.g., active or standby) is derived from the state of the associated attachment circuit. A "pseudowire" (e.g., one of many pseudowires 182) is an emulation of a service over a packet-switching network (e.g., MPLS or Internet Protocol). The emulated service may be ATM, Frame Relay, Ethernet, low-rate Time-division multiplexing (TDM), or Synchronous optical networking (SONET).

Figure 2:
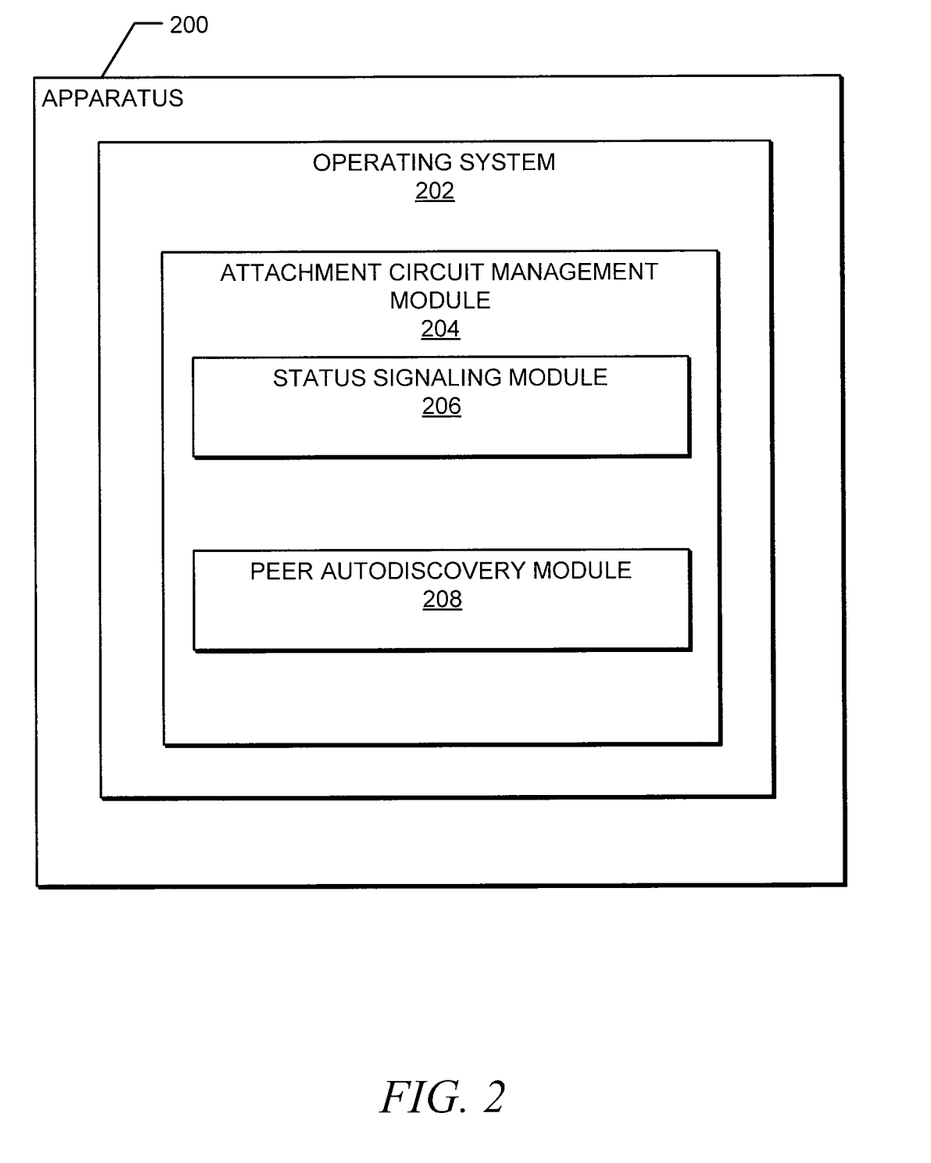
FIG. 2 depicts a block diagram of an attachment circuit management module, in accordance with an embodiment, included in an apparatus.

FIG. 2 depicts a block diagram of an attachment circuit management module 204, in accordance with an embodiment, included in an apparatus 200. It should be appreciated that the apparatus 200 may be deployed in the form of a variety of network devices, such as the routing devices 104 and 106 depicted in FIG. 1. In various embodiments, the apparatus 200 may be used to implement computer programs, logic, applications, methods, processes, or other software to signal status and discover inter-chassis communication peers, as described in more detail below.

The apparatus 200 includes an operating system 202 (e.g., an Internetworking Operating System) that manages the software processes and/or services executing on the apparatus 200. As depicted in FIG. 2, these software processes and/or services may include an attachment circuit management module 204, which is generally configured to identify the attachment circuit status. In this embodiment, the attachment circuit management module 204 may include a status signaling module 206 and a peer autodiscovery module 208. As explained in more detail below, the status signaling module 206 is configured to signal the attachment circuit status by way of BGP. The peer autodiscovery module 208 is configured to automatically discover inter-chassis communication peers, which is also described in more detail below.

It should be appreciated that in other embodiments, the apparatus 200 may include fewer or more modules apart from those shown in FIG. 2. For example, the status signaling module 206 may be combined with the peer autodiscovery module 208 into an integrated module that is configured to signal attachment circuit status and discover inter-chassis communication peers. The modules 204, 206, and 208 may be in the form of software that is processed by a processor. In another example, the modules 204, 206, and 208 may be in the form of firmware that is processed by Application Specific Integrated Circuits (ASICs), which may be integrated into a circuit board. Alternatively, the modules 204, 206, and 208 may be in the form of one or more logic blocks included in a programmable logic device (e.g., a field-programmable gate array). The described modules 204, 206, and 208 may be adapted, and/or additional structures may be provided, to provide alternative or additional functionalities beyond those specifically discussed in reference to FIG. 2. Examples of such alternative or additional functionalities will be discussed in reference to the flow diagrams discussed below. The modifications or additions to the structures described in relation to FIG. 2 to implement these alternative or additional functionalities will be implementable by those skilled in the art, having the benefit of the present specification and teachings.

Figure 3:
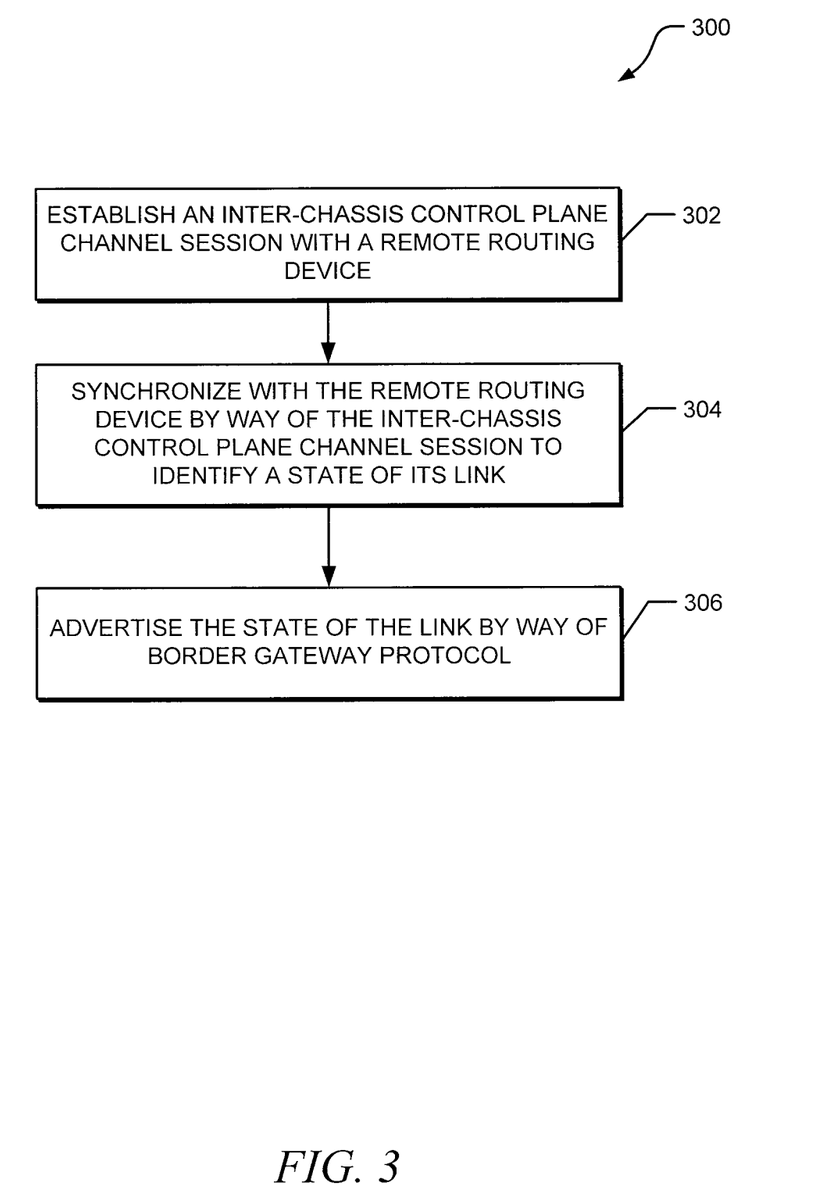
FIG. 3 depicts a flow diagram of a general overview of a method, in accordance with an embodiment, for signaling status by way of Border Gateway Protocol (BGP)

FIG. 3 depicts a flow diagram of a general overview of a method 300, in accordance with an embodiment, for signaling status by way of BGP. In one embodiment, the method 300 may be implemented by the status signaling module 206 and employed in the apparatus 200 of FIG. 2. As depicted in FIG. 3, a routing device establishes an inter-chassis control plane channel session at 302 with a remote routing device that is within the same redundancy group. Since both routing devices are within the same redundancy group, they are both linked to a multi-homed routing device.

After the inter-chassis control plane session is established, the routing device synchronizes at 304 with the remote routing device by way of the inter-chassis control plane channel session to identify a state of its link to the multi-homed routing device. As explained in more detail below, the state of the link may be identified by exchanging various information with the remote routing device.

With the state of its link identified, the routing device advertises its state to other routing devices by way of BGP signaling. It should be appreciated that BGP (e.g., MP-BGP) is an inter-domain routing protocol used, for example, within the Internet to exchange Internet Protocol (IP) address prefix and network layer reachability information (NLRI) between domains, and to distribute external IP address prefix information within a domain. In one embodiment, as depicted at 306, the routing device may advertise its state in a BGP message, which is explained in more detail below.

Figure 4:
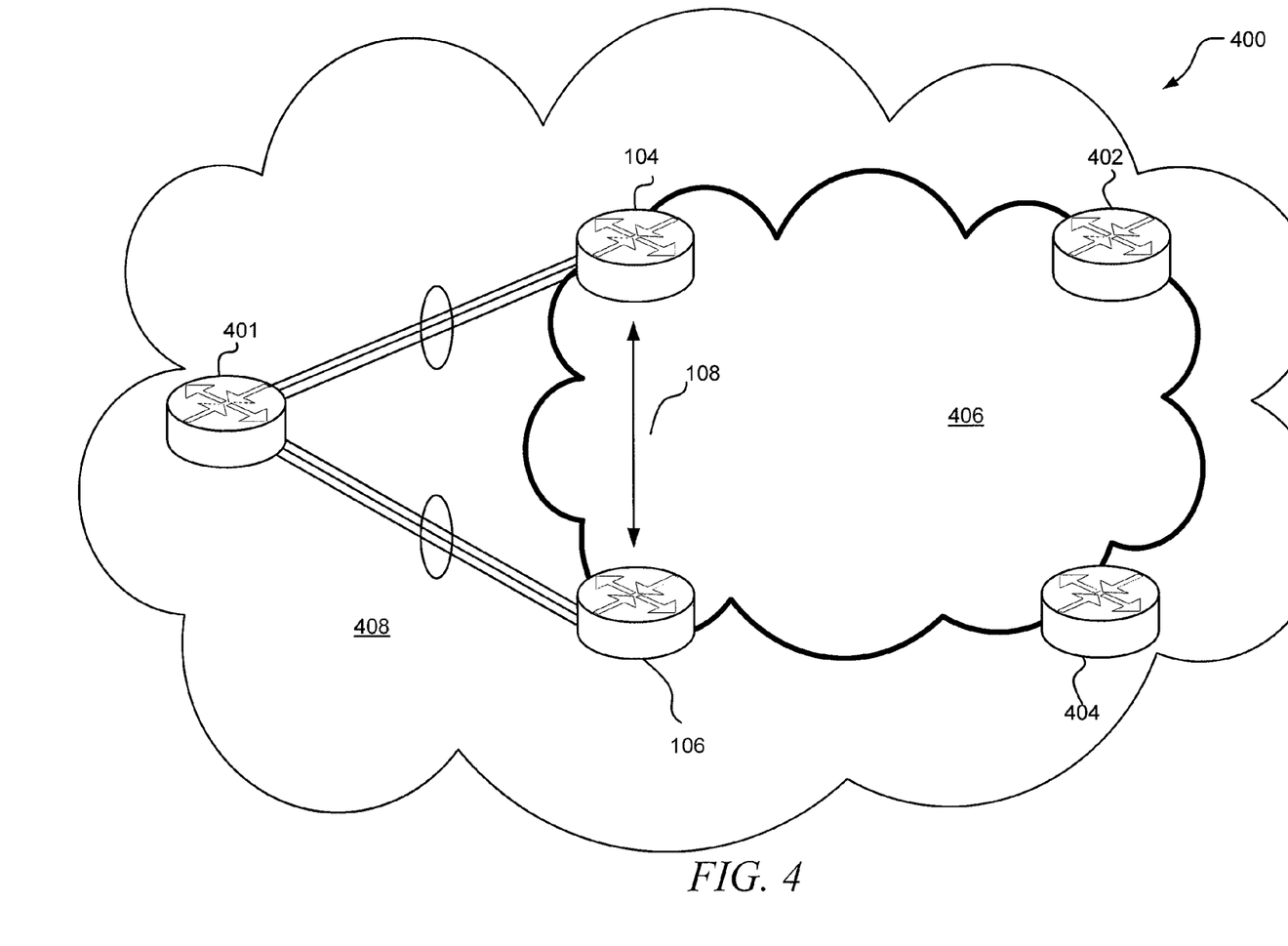
FIG. 4 depicts a diagram of an example of a computer network with customer and provider edge routers, consistent with one embodiment of the present invention.

FIG. 4 depicts a diagram of an example of a computer network 400 with customer and provider edge devices 401, 104, 106, 402, and 404, consistent with one embodiment of the present invention. This computer network 400 includes a provider domain 406 and a customer domain 408 that are interconnected by devices 401, 104, 106, 402, and 404. A domain (e.g., the provider domain 406 or the customer domain 408) is a collection of network nodes under the control of one or more entities that present a common routing policy. The domain may also be referred to as an autonomous system or community. It should be noted that a number of network nodes (e.g., devices 401, 104, 106, 402, and 404) and communication links may be used in the computer network 400, and that the computer network 400 depicted in FIG. 4 shown herein is for simplicity.

The distinct networks within domains 406 and 408 can be coupled together by the devices 401, 104, 106, 402, and 404. For Layer-2 services, the devices 104, 106, 402, and 404 are configured to communicate by way of BGP routing protocol. A provider edge (PE) routing device (e.g., PE routing device 104, 106, 402, and 404) is an example of an inter-domain routing device. The PE routing device can be placed at the edge of an Service Provider (SP) network, and may communicate by way of a routing protocol to another PE routing device or domain. A customer edge (CE) device (e.g., CE device 401), which may be a multi-homed device, can be located at the edge of a network associated with a customer or subscriber.

In the example of FIG. 4, the CE device 401 is dual-homed to PE routing devices 104 and 106 and, in this example, mLACP operates between the CE device 401 and its connected PE routing devices 104 and 106. Initially, an inter-chassis control plane channel session 108 (e.g., ICCP session), is established between the PE routing devices 104 and 106. The PE routing devices 104 and 106 synchronize with each other using the inter-chassis control plane channel session 108 to identify their attachment circuit states. In general, synchronization is the exchange of information between the PE routing devices 104 and 106. In multi-chassis operations, the PE routing devices 104 and 106 that are connected to the CE device 401 may exchange a variety of information such that they are synchronized. The information that may be exchanged includes, for example, system attributes and link attributes. Examples of system attributes include system priority and system Media Access Control (MAC) address. Examples of link attributes include, for example, port key, port number, and port priority.

From the exchange of such information by way of inter-chassis control plane channel session 108, each PE routing device 104 or 106 can identify whether its attachment circuit in a standby or active state. For example, the PE routing device 104 identifies its link attributes to the CE device 401 and transmits the link attributes to the PE routing device 106 by way of the inter-chassis control plane channel session 108. At the same time or in response to the transmission, the PE routing device 104 receives link attributes of the PE routing device 106 from the PE routing device 106 by way of the inter-chassis control plane channel session 108. The PE routing device 104 may then identify its state based on its system attributes, its link attributes, and link attributes of the PE routing device 106. Here, both PE routing devices 104 and 106 within the same redundancy group can run a variety of arbitration algorithms based on information exchanged to elect which attachment circuit should be in active or standby state for a given service instance.

Figure 5:
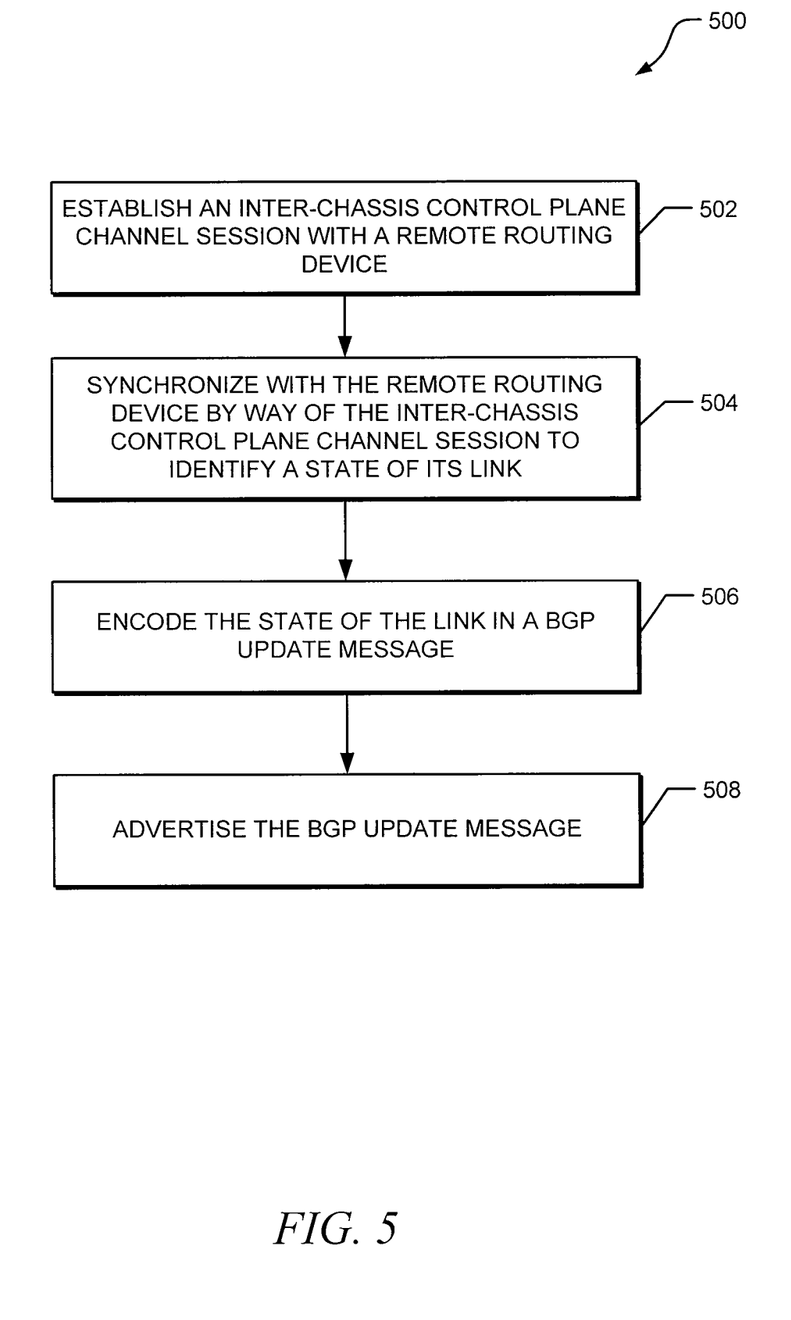
FIG. 5 depicts a flow diagram of a detailed method, in accordance with one embodiment, for signaling status by way of BGP.

FIG. 5 depicts a flow diagram of a detailed method 500, in accordance with one embodiment, for signaling status by way of BGP. As depicted in FIG. 5, a routing device establishes an inter-chassis control plane channel session at 502 with a remote routing device that is within the same redundancy group. Since both routing devices are within the same redundancy group, they are both linked to a multi-homed routing device.

After the inter-chassis control plane session is established, the routing device synchronizes with the remote routing device at 504 by way of the inter-chassis control plane channel session to identify its attachment circuit state. The routing device then encodes its state in a BGP update message at 506 and advertises the encoded BGP message at 508. A "BGP update message," as used herein, refers to a message used to provide routing updates between BGP systems. A BGP update message includes NLRI and route attributes, which are used to encode the various identifiers used for dynamic discovery, such as an IP address. In an embodiment, the state of the attachment circuit may be encoded in the NLRI field of a BGP route or the route attribute itself in the form of a binary flag where, for example, a value of "1" may indicate an active state while a value of "0" may indicate a standby state.

Figure 6:
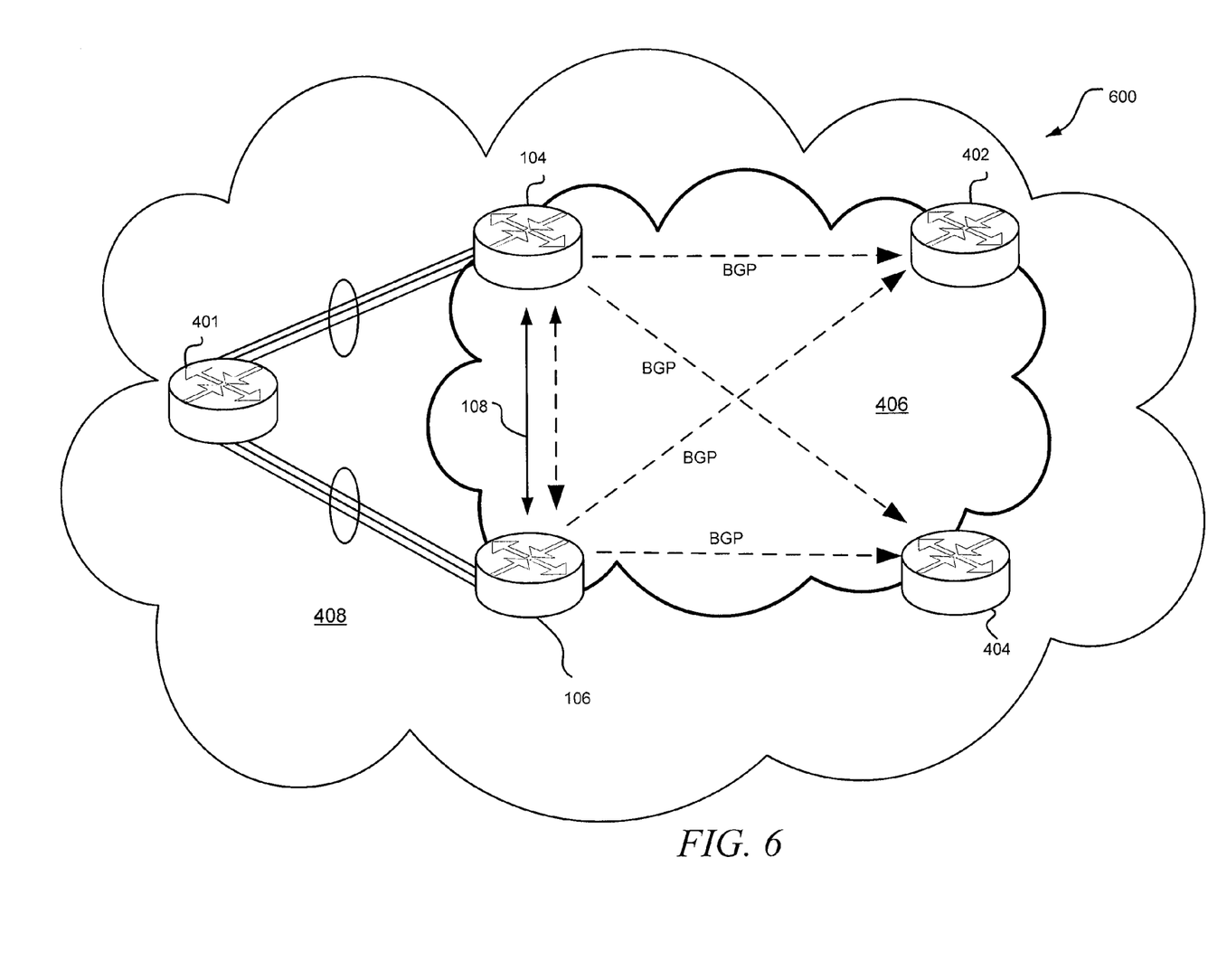
FIG. 6 depicts a diagram illustrating the signaling of attachment circuit status by way of BGP based on the embodiment described in FIG. 5.

FIG. 6 depicts a diagram illustrating the signaling of attachment circuit status by way of BGP based on the embodiment described in FIG. 5. The computer network 600 depicted in FIG. 6 includes a provider domain 406 and a customer domain 408, which are described above, that are interconnected by CE and PE devices 401, 104, 106, 402, and 404. The CE device 401 is dual-homed to PE routing devices 104 and 106 and, for example, mLACP operates between the CE device 401 and its connected PE routing devices 104 and 106.

In this example, an inter-chassis control plane channel session 108 is already established between PE routing devices 104 and 106. The PE routing devices 104 and 106 have already synchronized with each other by way of the inter-chassis control plane channel session 108 to identify their states. In this embodiment, each PE routing device 104 or 106 encodes its state in one or more BGP update messages and advertises the BGP update messages to the PE routing devices 402 and 404. For example, if the PE routing device 104 identifies itself to be in the active state, then it encodes a flag in an NLRI field of a BGP update message indicating an active state. The PE routing device 104 then advertises the encoded BGP update message to the PE routing devices 106, 402 and 404. At the same time, the PE routing device 106 identifies itself to be in the standby state and therefore, encodes a flag in an NLRI field of another BGP update message indicating a standby state. The PE routing device 106 then advertises this other BGP update message to the PE routing devices 104, 402 and 404.

Upon receipt of the BGP update messages, the PE routing devices 402 and 404 can identify from the NLRI fields that the PE routing device 104 is active while the other PE routing device 106 included in the same redundancy group is in standby. As a result, the PE routing devices 402 and 404 will forward data to the PE routing device 104, but not to the PE routing device 106. That is, for example, PE routing devices 402 and 404 will install the appropriate next hop information for PE routing device 104 into their forwarding table, and include such information in the Virtual Private LAN Service (VPLS) MAC learning and forwarding process. It should be further noted that unknown unicast, multicast, and broadcast traffic sent from PE routers 402 and 404 will be sent to PE routing device 104 and not to PE routing device 106 in this particular example network.

Figure 7:
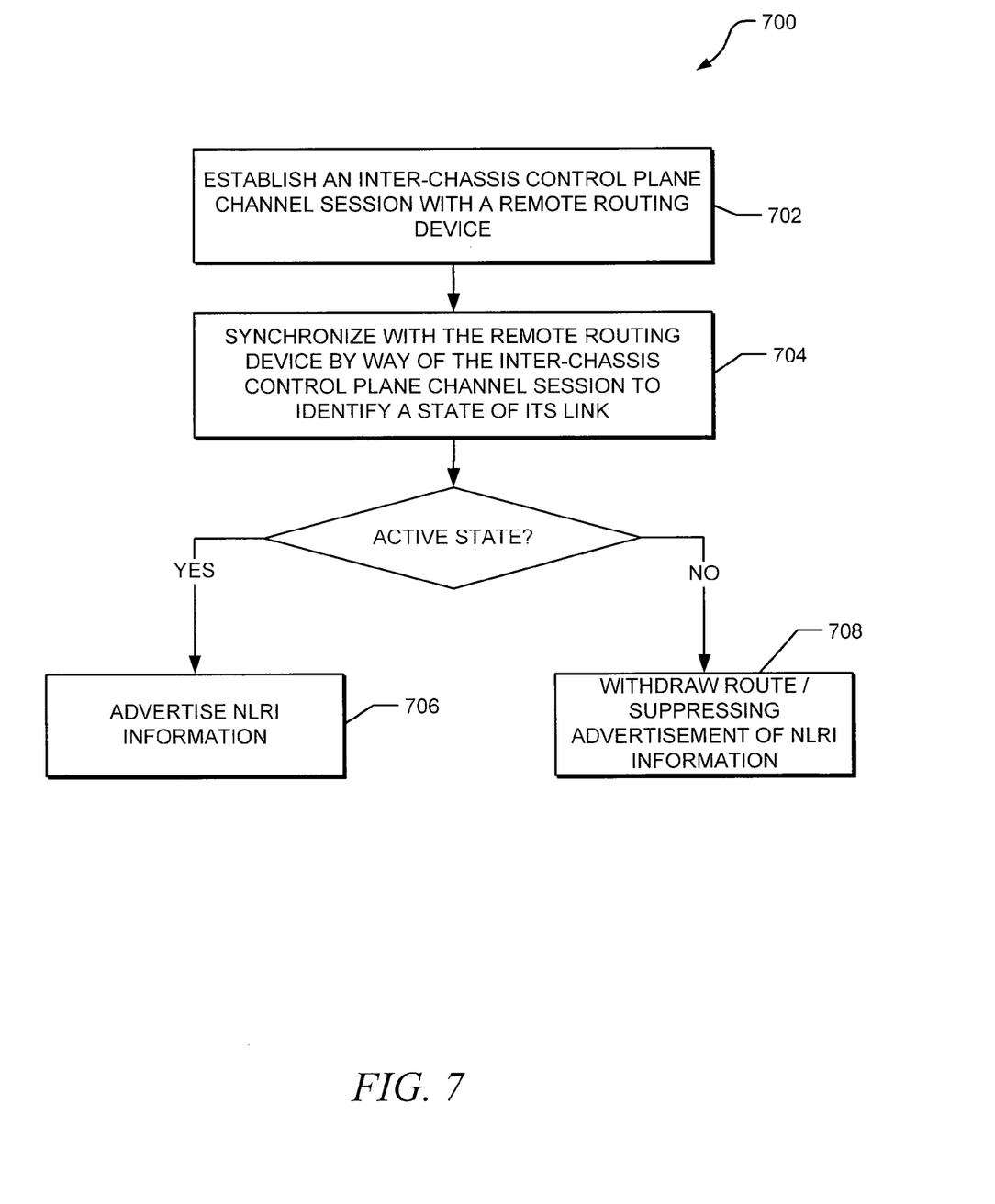
FIG. 7 depicts a flow diagram of a detailed method, in accordance with another embodiment, for signaling status by way of BGP.

FIG. 7 depicts a flow diagram of a detailed method 700, in accordance with another embodiment, for signaling status by way of BGP. As depicted in FIG. 7, a routing device establishes an inter-chassis control plane channel session at 702 with a remote routing device that is within the same redundancy group, and therefore they are both linked to a multi-homed routing device.

After the inter-chassis control plane session is established, the routing device synchronizes with the remote routing device at 704 by way of the inter-chassis control plane channel session to identify its attachment circuit state. If the attachment circuit on the routing device is in an active state, the routing device is configured to advertise its NLRI information at 706 to other remote routing devices within the domain such that these other remote routing devices can reach the routing device.

On the other hand, if the attachment circuit on the routing device is in standby state, then the routing device is configured to withdraw and/or suppress its BGP announcement. For example, as depicted at 708, if one or more routes already exist, then the routing device withdraws the routes. Alternatively, if no routes exist, then the routing device suppresses advertisement of NLRI information to other remote routing devices such that these other routing devices will not have the information to reach the routing device that is in standby state.

Figure 8:
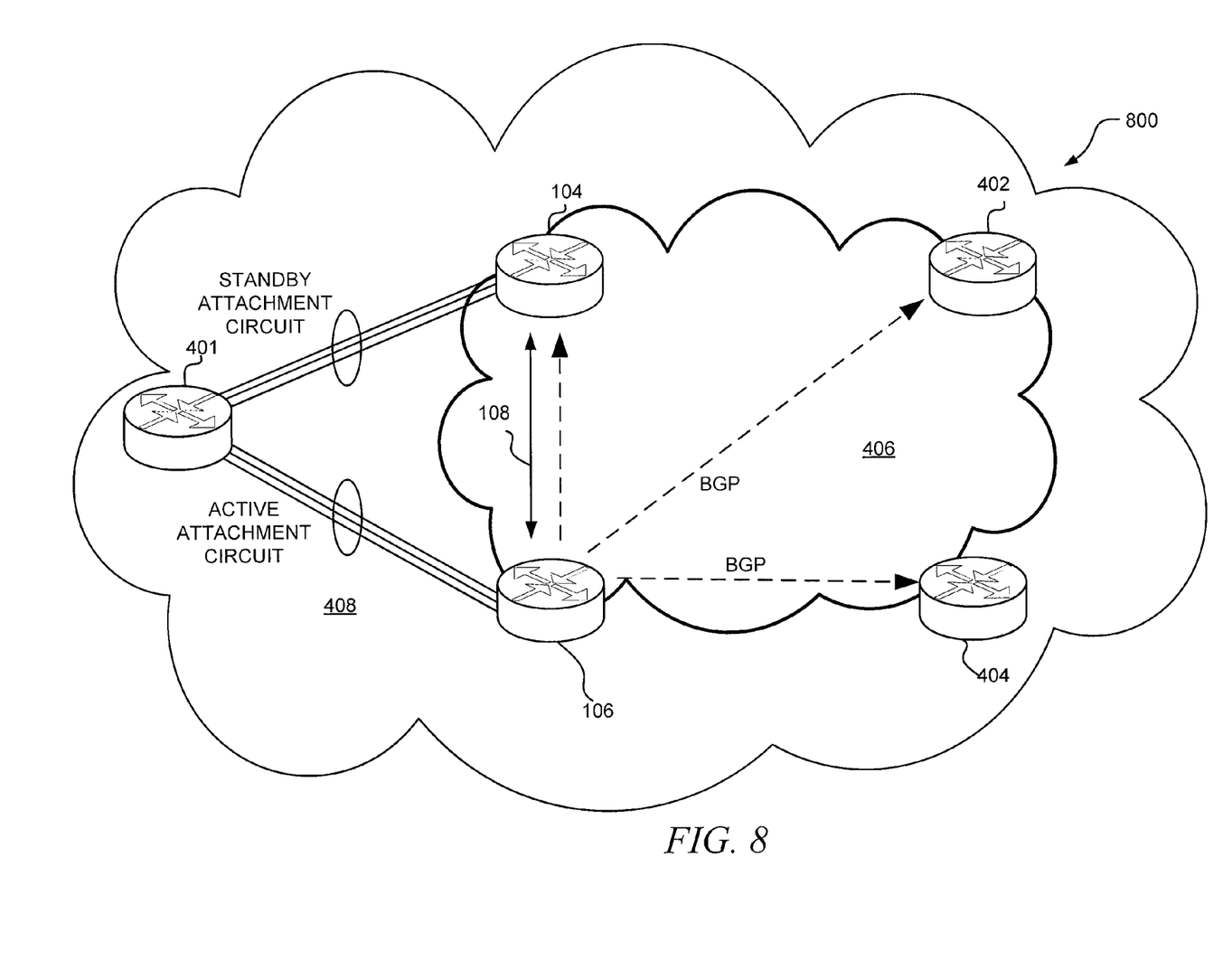
FIG. 8 depicts a diagram illustrating the signaling of attachment circuit status by way of BGP based on the embodiment described in FIG. 7.

FIG. 8 depicts a diagram illustrating the signaling of attachment circuit status by way of BGP based on the embodiment described in FIG. 7. The computer network 800 depicted in FIG. 8 includes a provider domain 406 and a customer domain 408, which are described above, that are interconnected by CE and PE devices 401, 104, 106, 402, and 404. Here, the CE device 401 is dual-homed to PE routing devices 104 and 106 and accordingly, mLACP operates between the CE device 401 and its connected PE routing devices 104 and 106. An inter-chassis control plane channel session 108 is already established between PE routing devices 104 and 106.

In this example, the PE routing devices 104 and 106 have already synchronized with each other to identify their attachment circuit state. In particular, the PE routing devices 104 and 106 have determined by way of the inter-chassis control plane channel session that the attachment circuit on PE routing device 106 is active while the attachment circuit on PE routing device 104 is in standby. As a result, the active PE routing device 106 advertises its NLRI information to PE routing devices 104, 402 and 404. Since there are no existing routes, the PE routing device 104 suppresses its advertisement of NLRI information to the other PE routing devices 106, 402 and 404. The remote PE routing devices 402 and 404 therefore receive the BGP announcement (or NLRI information) from only the PE routing device 106 and thereby install the appropriate next hop information for PE routing device 106 into their forwarding tables, which include such information in their VPLS MAC learning and forwarding process.

On the other hand, if the attachment circuit associated with PE routing device 106 fails, then the PE routing device 106 synchronizes with PE routing device 104 by way of inter-chassis control plane channel session 108 to make the other attachment circuit associated with the PE routing device 104 active. As a result, the PE routing device 104 then advertises its NLRI to PE routing devices 106, 402 and 404. The PE routing device 106, in turn, may withdraw routes (if routes exist) and subsequently suppress any further NLRI announcement. In this particular example, the PE routing device 104 may flush its MAC tables and transmit a MAC flush notification message, which triggers all other PE routing devices 106, 402 and 404 in that VPLS instance to flush their MAC tables. The PE routing device 402 therefore has PE routing device 104 in its forwarding table and, as a result, PE routing device 104 becomes a part of the VPLS domain and participates in MAC learning and forwarding.

It should be noted that if the PE routing device 106, for example, is further linked to another CE device (not shown) in the same customer domain, then the PE routing device 106 may continue to announce its own NLRI because this other attached CE device is still active. From the NLRI announcements, the PE routing device 402, for example, has both PE routing devices 104 and 106 in its forwarding table. Therefore, both the PE routing devices 104 and 106 become a part of the VPLS domain and participate in MAC learning and forwarding. The PE routing device 106 will locally forward traffic to its actively attached CE device, but block traffic to the standby CE device 401 because the PE routing device 106 has the attachment circuit connecting to CE device 401 in standby state.

Automatic Discovery of Inter-Chassis Communication Peers

Figure 9:
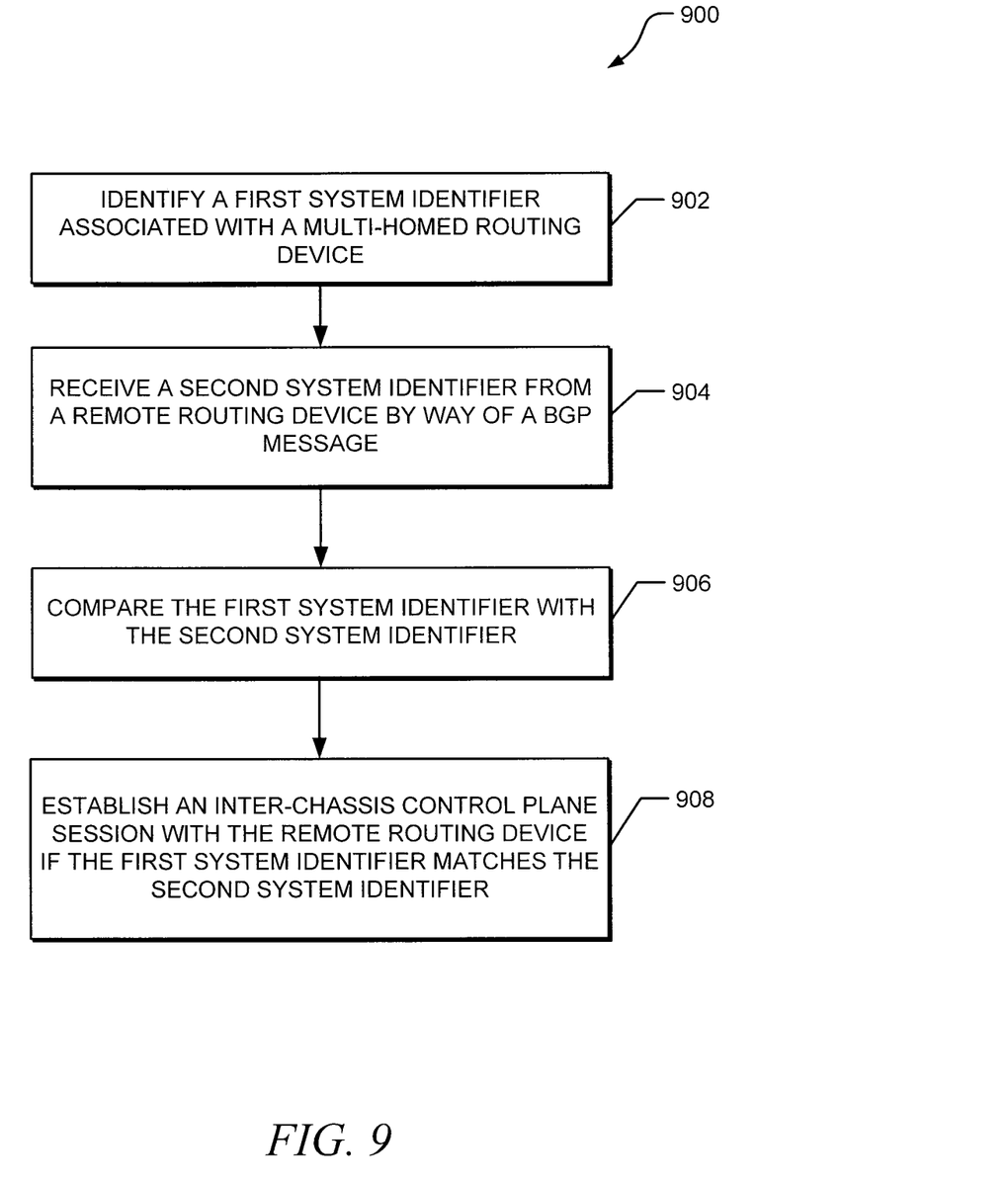
FIG. 9 depicts a flow diagram of a general overview of a method, in accordance with an embodiment, for discovering such Internet Protocol (IP) addresses of remote routing devices within the same redundancy group.

In inter-chassis communication, every routing device is configured or auto-configured with the IP addresses of remote routing devices within the same redundancy group with which it needs to establish connections. FIG. 9 depicts a flow diagram of a general overview of a method 900, in accordance with an embodiment, for discovering such IP addresses of remote routing devices within the same redundancy group. In an embodiment, the method 900 may be implemented by the peer autodiscovery module 208 and employed in the apparatus 200 of FIG. 2.

Generally, the routing devices exchange a shared identifier that identifies at least one routing device pair within which an inter-chassis control plane channel session is established, thereby forming a redundancy group. In an embodiment, as depicted at 902, a routing device identifies a system identifier (herein referred to as a "first" system identifier) that is associated with a linked multi-homed routing device. As used herein, a "system identifier," refers to a value that uniquely identifies a multi-homed device. For example, the system identifier may be a LACP system identifier that uniquely distinguishes a CE device in the context of an L2VPN service instance. It should be appreciated that in other embodiments, a variety of other identifiers may be used. For example, each PE routing device may be configured with a redundancy group identifier (RGID), which uniquely identifies a redundancy group associated with the PE routing device, and as explained in more detail below, the RGID is advertised rather than the system identifier.

In the embodiment of FIG. 9, the routing device then advertises the identified system identifier by way of, for example, BGP. One embodiment is to have the system identifier encoded as part of the advertised NLRI. Another embodiment is to have the system identifier encoded as a BGP Route attribute qualifying the NLRI.

At the same time, another remote routing device is also advertising its associated system identifier and, as depicted at 904, the routing device receives such a system identifier (herein referred to as a "second" system identifier) by way of BGP. The routing device then compares the first system identifier with the second system identifier at 906, and if the system identifiers match, then the routing device at 908 establishes an inter-chassis control plane channel session with the remote routing device that transmitted the second system identifier.

As an example, a CE device, which is a multi-homed routing device, is linked to a "first" PE routing device and a "second" PE routing device. The CE device communicates by way of mLACP with the first and second PE routing devices. The CE device advertises its system identifier to both the first and second PE routing devices by way of mLACP operation. Before the first PE routing device sends BGP NLRIs for VPLS automatic discovery, the first PE routing device encodes the associated system identifier that it has received either in the NLRI or as a route attribute. The second PE routing device also encodes its associated system identifier in the NLRI or as a route attribute. The first and second PE routing devices communicate the system identifiers with each other by way of, for example, BGP. From a match of the system identifiers, the first and second PE routing devices can identify or deduce that the CE device is dual-homed to both the first and second PE routing devices (both attachment circuits are in the same VPLS service domain). The first and second PE routing devices then trigger the setup or establishment of an inter-chassis control plane channel session between themselves.

Figure 10:
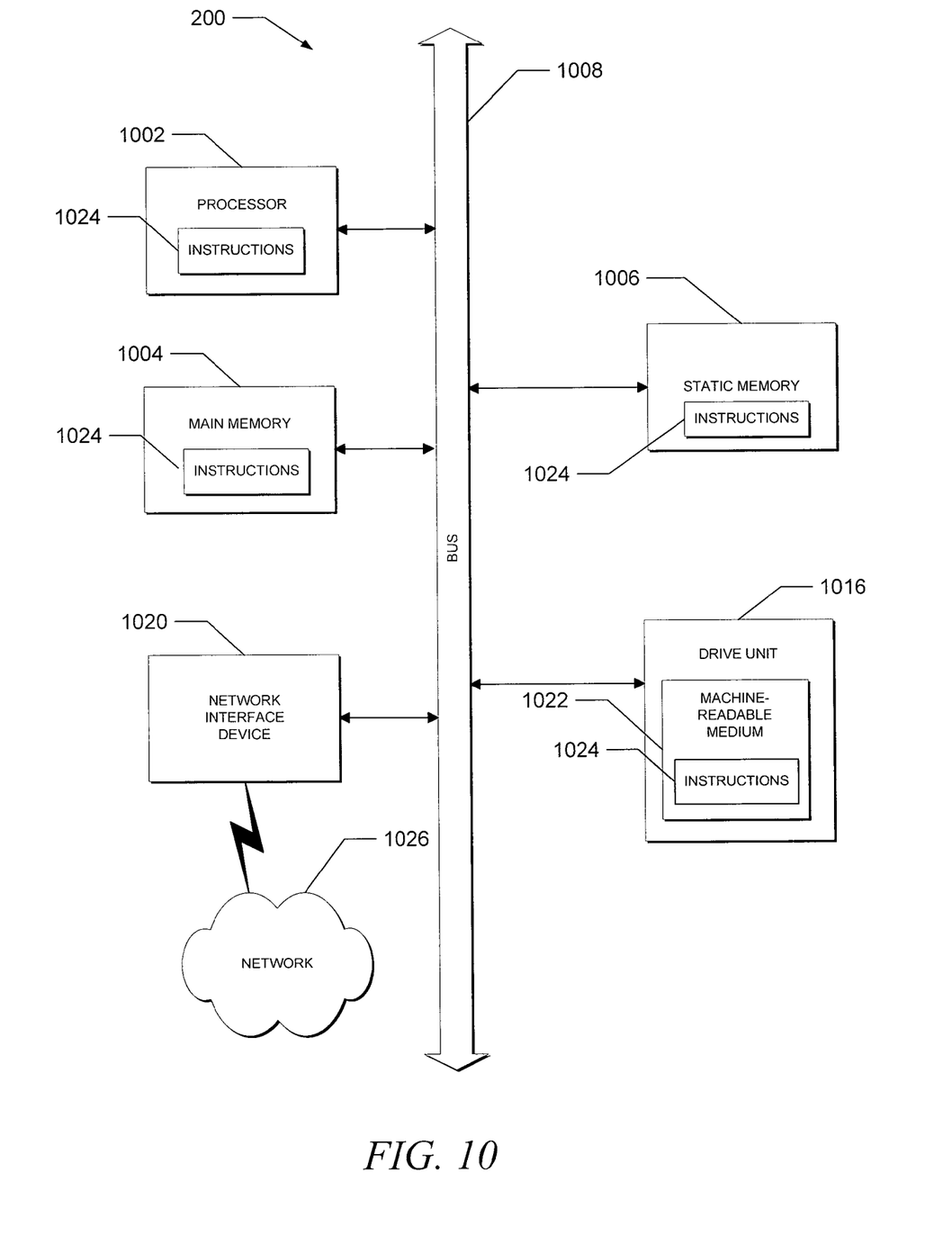
FIG. 10 is a simplified block diagram of a machine in the example form of an apparatus within which a set of instructions, for causing the machine to perform any one or more of the methodologies discussed herein, may be executed.

FIG. 10 is a simplified block diagram of a machine in the example form of an apparatus 200 within which a set of instructions, for causing the machine to perform any one or more of the methodologies discussed herein, may be executed. In alternative embodiments, the machine may be connected (e.g., networked) to other machines. The machine is capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example apparatus 200 includes a processor 1002 (e.g., a central processing unit (CPU)), a main memory 1004, and a static memory 1006, which communicate with each other via bus 1008. The apparatus 200 may also include a disk drive unit 1016 and a network interface device 1020.

The disk drive unit 1016 includes machine-readable medium 1022 on which is stored one or more sets of instructions and data structures 1024 (e.g., software) embodying or utilized by any one or more of the methodologies or functions described herein. The instructions may also reside, completely or at least partially, within the main memory 1004 and/or within the processor 1002 during execution thereof by the apparatus 200, with the main memory 1004 and the processor 1002 also constituting machine-readable, tangible media. The instructions 1024 may further be transmitted or received over computer network 1026 via network interface device 1020 utilizing any one of a number of well-known transfer protocols.

While machine-readable medium 1022 is shown in an embodiment to be a single medium, the term "machine-readable medium" should be taken to include a single medium or multiple media (e.g., a centralized or distributed database, and/or associated caches) that store the one or more sets of instructions. The term "machine-readable medium" shall also be taken to include any medium that is capable of storing, encoding or carrying a set of instructions for execution by the machine and that cause the machine to perform any one or more of the methodologies of the present application, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the invention(s).

What is claimed is:

1. A method at a routing device, the method comprising:
establishing an inter-chassis control plane channel session with a remote routing device, the routing device and the remote routing device being linked to a multi-homed routing device;

synchronizing with the remote routing device by way of the inter-chassis control plane channel session to identify a state of a link from the routing device to the multi-homed routing device, the synchronization with the remote routing device including:
    identifying information associated with the link from the routing device to the multi-homed routing device;
    transmitting the information associated with the link to the remote routing device within the inter-chassis control plane channel session;
    receiving additional information from the remote routing device within the inter-chassis control plane channel session; and
    identifying the state of the link based on the information and the additional information; and
advertising the state of the link by way of Border Gateway Protocol (BGP), the advertising of the state of the link including:
    encoding the state of the link in a BGP update message, and
    advertising the BGP update message through the BGP protocol.

2. The method of claim 1, wherein the multi-homed routing device is multi-homed to the routing device and the remote routing device based on a link aggregation protocol.

3. The method of claim 1, wherein the BGP update message includes a Network Layer Reachability Information (NLRI) field, and wherein the state of the link is encoded in the NLRI field.

4. The method of claim 1, wherein the advertisement of the state of the link comprises advertising Network Layer Reachability Information of the routing device based on the state of the link being in an active state.

5. The method of claim 1, wherein the advertisement of the state of the link comprises withdrawing a route based on the state of the link being in a standby state.

6. The method of claim 1, wherein the advertisement of the state of the link is based on the link being in an active state, the method further comprising suppressing advertisement of Network Layer Reachability Information of the routing device based on the state of the link being in a standby state.

7. The method of claim 1, further comprising:
    identifying a first system identifier associated with the multi-homed routing device linked to the routing device;
    receiving a second system identifier from a remote routing device by way of the BGP;
    comparing the first system identifier with the second system identifier; and
    establishing the inter-chassis control plane channel session with the remote routing device based on a match of the first system identifier with the second system identifier.

8. A non-transitory machine-readable medium that stores instructions, which, when performed by a routing device, cause the routing device to perform operations comprising:
    establishing an inter-chassis control plane channel session with a remote routing device, the routing device and the remote routing device being linked to a multi-homed routing device;
    synchronizing with the remote routing device by way of the inter-chassis control plane channel session to identify a state of a link from the routing device to the multi-horned routing device, the synchronization with the remote routing device including:
        identifying information associated with the link from the routing device to the multi-homed routing device;
        transmitting the information associated with the link to the remote routing device within the inter-chassis control plane channel session;
        receiving additional information from the remote routing device within the inter-chassis control plane channel session; and
        identifying the state of the link based on the information and the additional information; and
    advertising the state of the link by way of Border Gateway Protocol (BGP), the advertising of the state of the link including:
        encoding the state of the link in a BGP update message, and
        advertising the BGP update message through the BGP protocol.

9. The non-transitory machine-readable medium of claim 8, wherein the multi-homed routing device is multi-homed to the routing device and the remote routing device based on a link aggregation protocol.

10. The non-transitory machine-readable medium of claim 8, wherein the inter-chassis control plane channel session is an Inter-Chassis Communication Protocol (ICCP) session.

11. The non-transitory machine-readable medium of claim 8, wherein the BGP update message includes a Network Layer Reachability Information (NLRI) field, and wherein the state of the link is encoded in the NM field.

12. The non-transitory machine-readable medium of claim 8, wherein the operation of advertising the state of the link comprises advertising Network Layer Reachability Information of the routing device based on the state of the link being in an active state.

13. The non-transitory machine-readable medium of claim 8, wherein the operation of advertising the state of the link comprises withdrawing a route based on the state of the link being in a standby state.

14. The non-transitory machine-readable medium of claim 8, wherein the operation of advertising the state of the link is based on the link being in an active state, and wherein the operations further operable to suppress advertisement of Network Layer Reachability Information of the routing device based on the state of the link being in a standby state.

15. An apparatus comprising:
    a status signaling module configured to:
        establish an inter-chassis control plane channel session with a routing device, the apparatus and the routing device being linked to a multi-homed routing device;
        synchronize with the routing device by way of the inter-chassis control plane channel session to identify a state of a link from the apparatus to the multi-homed routing device, the synchronization with the remote routing device including:
            identifying information associated with the link from the routing device to the multi-horned routing device;
            transmitting the information associated with the link to the remote routing device within the inter-chassis control plane channel session;
            receiving additional information from the remote routing device within the inter-chassis control plane channel session; and
            identifying the state of the link based on the information and the additional information; and
        advertise the state of the link by way of Border Gateway Protocol (BGP), the advertising of the state of the link including:
            encoding the state of the link in a BGP update message, and advertising the BGP update message through the BGP protocol.

16. The apparatus of claim 15, wherein the BGP update message includes a Network Layer Reachability Information (NLRI) field, and wherein the state of the link is encoded in the NLRI field.

17. The apparatus of claim 15, wherein the advertisement of the state of the link comprises advertising Network Layer Reachability information of the apparatus based on the state of the link being in an active state.

18. The apparatus of claim 15, wherein the advertisement of the state of the link comprises withdrawing a route based on the state of the link being in a standby state.

19. The apparatus of claim 15, wherein the advertisement of the state of the link is based on the link being in an active state, the operations further comprising suppressing advertisement of Network Layer Reachability Information of the apparatus based on the state of the link being in a standby state.

20. A method at a routing device, the method comprising:
    identifying a first system identifier associated with a multi-homed routing device linked to the routing device;
    receiving a second system identifier from a remote routing device by way of Border Gateway Protocol (BGP);
    comparing the first system identifier with the second system identifier;
    establishing an inter-chassis control plane channel session with the remote routing device based on a match of the first system identifier with the second system identifier; and
    synchronizing with the remote routing device by way of the inter-chassis control plane channel session to identify a state of a link from the routing device to the multi-homed routing device, the synchronization with the remote routing device including:
        identifying information associated with the link from the routing device to the multi-homed routing device;
        transmitting the information associated with the link to the remote routing device within the inter-chassis control plane channel session;
        receiving additional information from the remote routing device chassis control plane channel session; and
        identifying the state of the link based on the information and the additional information.

21. The method of claim 20, further comprising:
advertising the state of the link by way of the BGP, the advertising of the state of the link including:
encoding the state of the link in a BGP update message, and advertising the BGP update message through the BGP protocol.

* * * * *

UNITED STATES PATENT AND TRADEMARK OFFICE
CERTIFICATE OF CORRECTION

PATENT NO. : 8,503,329 B2  
APPLICATION NO. : 12/536427  
DATED : August 6, 2013  
INVENTOR(S) : Mullooly et al.

Page 1 of 1

It is certified that error appears in the above-identified patent and that said Letters Patent is hereby corrected as shown below:

In the Claims

In column 11, line 63-64, in Claim 8, delete "multi-horned" and insert --multi-homed--, therefor In column 12, line 26, in Claim 11, delete "NM" and insert --NLRI--, therefor

In column 12, line 51, in Claim 15, delete "including;" and insert --including:--, therefor In column 12, line 53, in Claim 15, delete "multi-horned" and insert --multi-homed--, therefor In column 13, line 9, in Claim 17, delete "information" and insert --Information--, therefor In column 14, line 16, in Claim 20, delete "chassis" and insert --within the inter-chassis--, therefor Signed and Sealed this  
Thirty-first Day of December, 2013

Margaret A. Focarino  
*Commissioner for Patents of the United States Patent and Trademark Office*